US012643081B2

(12) United States Patent
Züttel et al.

(10) Patent No.: US 12,643,081 B2
(45) Date of Patent: Jun. 2, 2026

(54) METHANATION REACTOR AND METHOD

(71) Applicants: ECOLE POLYTECHNIQUE FEDERALE DE LAUSANNE (EPFL), Lausanne (CH); GAZNAT SA, Lausanne (CH)

(72) Inventors: Andreas Züttel, Sion (CH); Noris Gallandat, Schwarzsee (CH)

(73) Assignees: ECOLE POLYTECHNIQUE FEDERALE DE LAUSANNE (EPFL), Lausanne (CH); GAZNAT SA, Lausanne (CH)

( * ) Notice: Subject to any disclaimer, the term of this patent is extended or adjusted under 35 U.S.C. 154(b) by 207 days.

(21) Appl. No.: 18/744,812

(22) Filed: Jun. 17, 2024

(65) Prior Publication Data

US 2024/0335809 A1 Oct. 10, 2024

Related U.S. Application Data

(62) Division of application No. 16/968,626, filed as application No. PCT/EP2019/053124 on Feb. 8, 2019, now abandoned.

(30) Foreign Application Priority Data

Feb. 9, 2018 (EP) ..................................... 18156137
Oct. 1, 2018 (EP) ..................................... 18197885

(51) Int. Cl.
B01J 8/00 (2006.01)
B01J 8/02 (2006.01)
(Continued)

(52) U.S. Cl.
CPC .............. B01J 8/001 (2013.01); B01J 8/0005 (2013.01); B01J 8/025 (2013.01); B01J 8/0285 (2013.01);
(Continued)

(58) Field of Classification Search
CPC . B01J 8/001; B01J 8/0005; B01J 8/025; B01J 8/0285; B01J 8/0292; B01J 21/04;
(Continued)

(56) References Cited

U.S. PATENT DOCUMENTS 2,472,377 A * 6/1949 Keith ................... C07C 1/0465
518/712
2,662,911 A * 12/1953 Dorschner .............. C07C 45/49
208/950

(Continued)

FOREIGN PATENT DOCUMENTS

AU 1149595 A * 8/1995 ............. F23C 3/002
CN 2400445 Y 10/2000
(Continued)

OTHER PUBLICATIONS

Gallandat, N. et al. "Experimental performance investigation of a 2 kW methanation reactor" Sustainable Energy & Fuels, Jan. 1, 2018, pp. 1101-1110, vol. 2, No. 5.
(Continued)

*Primary Examiner* — Kaity V Chandler
(74) *Attorney, Agent, or Firm* — SALIWANCHIK, LLOYD & EISENSCHENK

(57) ABSTRACT

The present relates to a chemical reactor comprising a catalyst bed enclosed in a reactor vessel and at least one cooling tube placed in the reactor vessel and passing through the catalyst bed, characterized in that the cooling tubes are disposed within the reactor so as to generate thermal gradients of at least 20° C./cm thereby generating hot spots throughout the reactor upon carrying out a reaction. The invention further relates to a methanation process.

16 Claims, 5 Drawing Sheets

(51) Int. Cl.

| | |
|---|---|
| *B01J 21/04* | (2006.01) |
| *B01J 23/46* | (2006.01) |
| *B01J 23/755* | (2006.01) |
| *C10L 3/08* | (2006.01) |

(52) U.S. Cl.

CPC ............. *B01J 8/0292* (2013.01); *B01J 21/04* (2013.01); *B01J 23/462* (2013.01); *B01J 23/755* (2013.01); *C10L 3/08* (2013.01); *B01J 2208/00061* (2013.01); *B01J 2208/00132* (2013.01); *B01J 2208/00407* (2013.01); *B01J 2208/0053* (2013.01); *B01J 2208/00539* (2013.01); *B01J 2208/00557* (2013.01); *B01J 2208/00902* (2013.01)

(58) Field of Classification Search

CPC ................... B01J 23/462; B01J 23/755; B01J 2208/00061; B01J 2208/00132; B01J 2208/00407; B01J 2208/0053; B01J 2208/00539; B01J 2208/00557; B01J 2208/00902; B01J 23/75; C10L 3/08

See application file for complete search history.

(56) References Cited

U.S. PATENT DOCUMENTS

| | | | | |
|---|---|---|---|---|
| 2,885,447 | A * | 5/1959 | Mckinnis | B01J 8/087 |
| | | | | 95/143 |
| 3,407,149 | A * | 10/1968 | Taylor | B01J 23/755 |
| | | | | 48/214 A |
| 3,508,889 | A * | 4/1970 | Epperly | B01J 23/755 |
| | | | | 48/214 A |
| 3,516,800 | A * | 6/1970 | Noboru | B01J 8/0453 |
| | | | | 422/205 |
| 3,950,368 | A * | 4/1976 | Broecker | C10G 11/10 |
| | | | | 518/715 |
| 3,970,435 | A * | 7/1976 | Schultz | C07C 1/0485 |
| | | | | 518/706 |
| 3,990,866 | A * | 11/1976 | Broecker | B01J 23/755 |
| | | | | 48/214 A |
| 4,583,994 | A * | 4/1986 | Frost | C07C 1/00 |
| | | | | 48/197 R |
| 4,725,573 | A * | 2/1988 | Mesters | C07C 1/0435 |
| | | | | 502/331 |
| 4,732,918 | A | 3/1988 | Lohmueller et al. | |
| 4,839,391 | A | 6/1989 | Range et al. | |
| 5,520,891 | A * | 5/1996 | Lee | F28D 7/085 |
| | | | | 165/910 |
| 6,221,117 | B1 * | 4/2001 | Edlund | B01J 8/006 |
| | | | | 422/106 |
| 7,226,567 | B1 * | 6/2007 | Olbert | C07C 45/38 |
| | | | | 422/659 |
| 9,796,643 | B2 * | 10/2017 | Buchanan | B01J 23/8892 |
| 2001/0000380 | A1 * | 4/2001 | Buxbaum | B01D 71/02231 |
| | | | | 95/55 |
| 2002/0106539 | A1 * | 8/2002 | Chong | C01B 3/16 |
| | | | | 423/652 |
| 2003/0159354 | A1 * | 8/2003 | Edlund | C01B 3/503 |
| | | | | 422/187 |
| 2004/0192989 | A1 * | 9/2004 | Espinoza | B01J 8/067 |
| | | | | 422/600 |
| 2007/0259975 | A1 | 11/2007 | Lee et al. | |
| 2013/0247454 | A1 * | 9/2013 | Laska | B01J 8/0025 |
| | | | | 44/457 |
| 2015/0152025 | A1 * | 6/2015 | Cizeron | C07C 2/78 |
| | | | | 585/324 |
| 2016/0362348 | A1 * | 12/2016 | Ryu | C07C 1/045 |
| 2017/0320729 | A1 * | 11/2017 | Saloway | B01J 8/025 |

FOREIGN PATENT DOCUMENTS

| | | | | | |
|---|---|---|---|---|---|
| CN | 102482173 | B * | 4/2015 | ............. | C07C 1/041 |
| CN | 104645897 | A * | 5/2015 | ............. | C01B 3/16 |
| CN | 105592919 | A * | 5/2016 | ............. | B01J 8/008 |
| CN | 105664999 | A * | 6/2016 | ......... | B01J 29/0333 |
| CN | 107163989 | A * | 9/2017 | ............. | C10K 3/02 |
| DE | 3414717 | | 10/1985 | | |
| DE | 3612734 | C1 * | 12/1987 | ........... | B01J 8/0285 |
| DE | 102010040757 | A1 * | 3/2012 | ............. | B01J 8/067 |
| DE | 102014010055 | | 1/2016 | | |
| DE | 102014011274 | | 2/2016 | | |
| EP | 0241902 | | 10/1987 | | |
| JP | 2003 321400 | | 11/2003 | | |
| WO | WO-2005054125 | A1 * | 6/2005 | ........... | C01B 3/586 |
| WO | WO 2011/017242 | | 2/2011 | | |
| WO | WO-2011076315 | A2 * | 6/2011 | ......... | B01J 19/0006 |
| WO | WO-2012035173 | A1 * | 3/2012 | ............. | C10G 2/32 |
| WO | WO-2012045766 | A2 * | 4/2012 | ........... | B01J 8/0453 |
| WO | WO 2016/139452 | | 9/2016 | | |

OTHER PUBLICATIONS

Written Opinion in International Application No. PCT/EP2019/053124, Apr. 5, 2019, pp. 1-8.

* cited by examiner

Cooling water inlet

Thermocouple (K-type)

Heating Coil (540W)

Thermocouple (K-type)

Cooling water outlet

Cooling Tubes (6x)

Catalyst Bed

Thermocouple (K-type)

$CH_4, H_2O$ $CO_2, H_2$

METHANATION REACTOR AND METHOD

CROSS-REFERENCE TO RELATED APPLICATIONS

This application is a divisional of U.S. application Ser. No. 16/968,626, filed Aug. 10, 2020, pending, which is the national stage of international application No. PCT/EP2019/053124, filed Feb. 8, 2019.

TECHNICAL FIELD

The present invention relates to a chemical reactor and a thermal management system maximizing the conversion of the Sabatier reaction. The invention further relates to a process for the synthesis of hydrocarbons from hydrogen and carbon dioxide, in particular by Sabatier reaction.

BACKGROUND OF THE ART

The chemical reactions and processes that allow producing synthetic hydrocarbons from hydrogen and carbon dioxide have the potential to play an important role in the energy turnaround. The Sabatier reaction is especially interesting as it produces methane with a high selectivity, which can be directly integrated in the existing natural gas infrastructure.

The methanation reaction was first discovered by the French chemist Paul Sabatier at the beginning of the 20th century. The reaction describes the production of methane and water from hydrogen and carbon dioxide, as shown in equation ((1) below:

$$CO_2 + 4H_2 \leftrightarrow CH_4 + 2H_2O_{(l)} \tag{1}$$

$$\Delta H_R^0 = -252.8 \text{ kJ/mol}$$

$$\Delta S_R^0 = -409.9 \text{ J/mol-K}$$

As shown, this process is highly exothermic, with a reaction enthalpy of −252.8 KJ/mol at standard conditions (T=273.15K, p=1.013.105 Pa). Because of this, the thermodynamic equilibrium conversion is shifted to the reactant side at higher temperature. FIG. 1 shows the maximal equilibrium conversion as a function of the temperature and at different pressures, and one can see that high conversion rates can only be achieved at low temperatures.

On the other hand, the kinetics of the reaction follow the Arrhenius law which means that the rate of reaction increases exponentially with the temperature, as shown in equation ((2) below and in FIG. 2.

$$k_f = k_0 e^{\left(-\frac{E_a}{RT}\right)} \tag{2}$$

Thus, there is a problem arising in this chemical reaction that two competing trends have to be balanced: a higher temperature enables a faster reaction, but the thermodynamic conversion is limited, while a lower temperature limits the reaction rate but allows for a high thermodynamic equilibrium conversion.

In order to solve this technical problem, different types of reactor have been designed to improve the reaction yield. Today, there basically exist two main reactor designs: tube reactors and plate reactors. In general, both cases emphasize on how to minimize the temperature gradients within the reactor in order to reach an isothermal operation.

For example, document DE102014010055A1 discloses a methanation reactor comprising a two-phase cooling system and a process to control the temperature of the system and remove the heat of reaction by boiling a cooling medium. However, this document is silent regarding any reference to maintaining a specific temperature profile within the reactor in order to maximize the conversion.

Another document, DE102014011274 presents a heat exchanger design for a chemical reactor, and especially for a methanation reactor, that consists of plates welded together, and a circulating cooling medium in the space between the plates. A thermal coupling between the cooling medium and the gas products is thereby achieved and the temperature can be maintained accurately but there is no mention of maintaining a specific temperature profile within the reactor in order to maximize the conversion.

In view of the above, a primary object of the invention is to solve the above-mentioned problems and more particularly to provide a methanation reactor designed and adapted to provide and maintain a specific temperature profile within the reactor in order to maximize the Sabatier conversion, or any other exothermic reaction.

SUMMARY OF THE INVENTION

The above problems are solved by the present invention.

A first aspect of the invention is a chemical reactor comprising a catalyst bed enclosed in a reactor vessel and at least one cooling tube placed in the reactor vessel and passing through the catalyst bed, characterized in that the cooling tubes are disposed within the reactor so as to generate thermal gradients of at least 20° C./cm thereby generating hot spots throughout the reactor upon carrying out a reaction.

According to a preferred embodiment of the present invention, the catalysts comprise at least one of Nickel, Cobalt and Ruthenium based catalysts.

Advantageously, the catalysts comprise 20% wt. Ni/Al$_2$O$_3$ or 3% wt. Ru/Al$_2$O$_3$.

According to a particular aspect, when the catalyst comprises Nickel loading on alimuna, the nickel loading may vary from 1 to about 20% wt.

According to another particular aspect, when the catalyst comprises ruthenium loading on alimuna, the ruthenium loading may vary from 0.25 to about 3% wt, (e.g. 05% wt Ru). Preferably, the chemical reactor comprises at least two cooling tubes.

According to a preferred embodiment of the present invention, the minimal distance between the tubes is not less than 1.5 times the tube diameter.

Advantageously, the minimal distance between the tubes is not less than 2 times the tube diameter.

Preferably, the temperature of the cooling medium is different in the different tubes.

According to a preferred embodiment of the present invention, the tubes are fed with a cooling medium such as water, oil or any other fluid suitable for this purpose.

Advantageously, the thermal gradients is at least 100° C./cm.

Preferably, the temperature gradients are controlled by controlling either the space velocity of the inlet reactant gases and/or the flow rate of the cooling medium.

According to a preferred embodiment of the present invention, the chemical reactor comprises a thermal management system adapted to remove the heat from the reaction zone and to control the temperature of the chemical reactor.

According to a preferred embodiment of the present invention, the reactor is adapted for an exothermic chemical reaction.

According to another aspect, is provided a method of production of methane from hydrogen and carbon dioxide (Sabatier reaction) comprising the steps of:

a) Providing a chemical reactor comprising a reaction chamber which comprises a gas loading zone and a catalyzed reaction zone comprising a catalyst bed;

b) Loading a reaction gas mixture of hydrogen and carbon dioxide in the gas loading zone of the reaction chamber, such that the gas pressure in the reaction chamber is between about 1 and 20 bar (e.g. 5 bar);

c) Heating the reaction chamber, in particular the catalyst bed at a temperature between about 220 and about 260° C. such that the Sabatier reaction and a gas flow through the catalyst bed start;

d) Creating a temperature gradient of about 100° C. within the reaction chamber and in particular within the catalyst bed by cooling the catalyst bed with a cooling system directly integrated in said catalyst bed;

e) Collecting the resulting gas mixture (methane and water) flowing through the catalyst bed.

The particular advantages of this device of the invention are to solve the technical problem identified above.

BRIEF DESCRIPTION OF THE DRAWINGS

Further particular advantages and features of the invention will become more apparent from the following non-limitative description of at least one embodiment of the invention which will refer to the accompanying drawings, wherein.

DETAILED DESCRIPTION OF THE INVENTION

Figure 1:
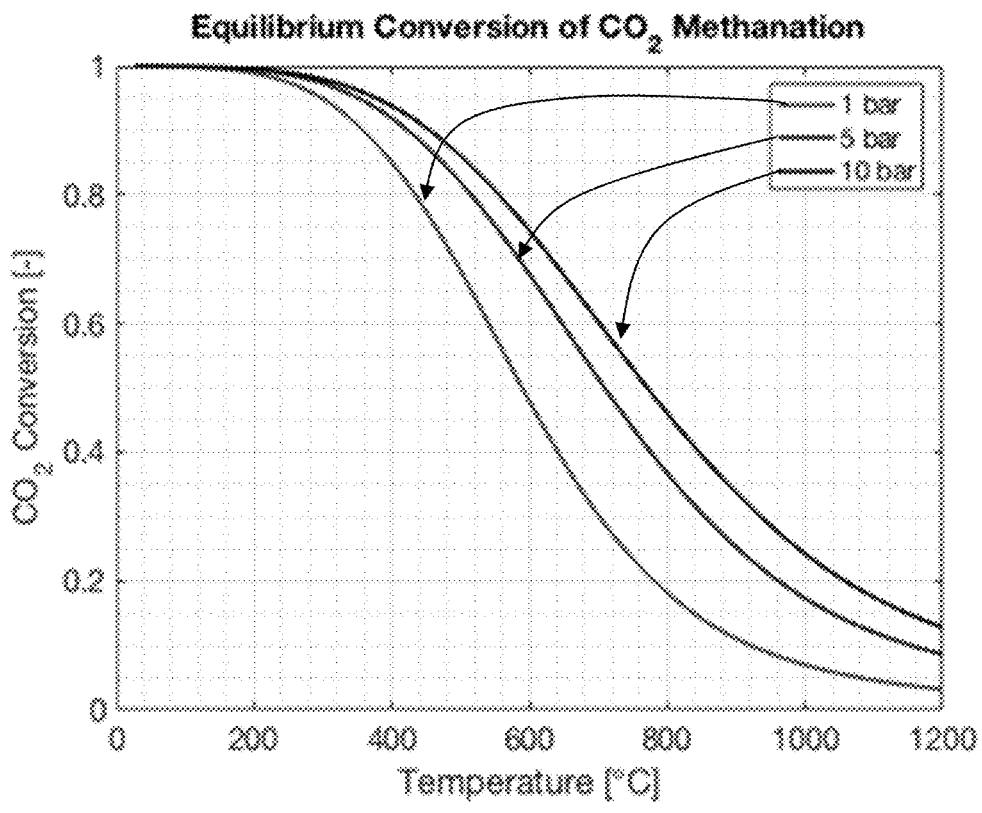
FIG. 1 represents the Thermodynamic equilibrium conversion as a function of the temperature at different pressures.
Figure 2:
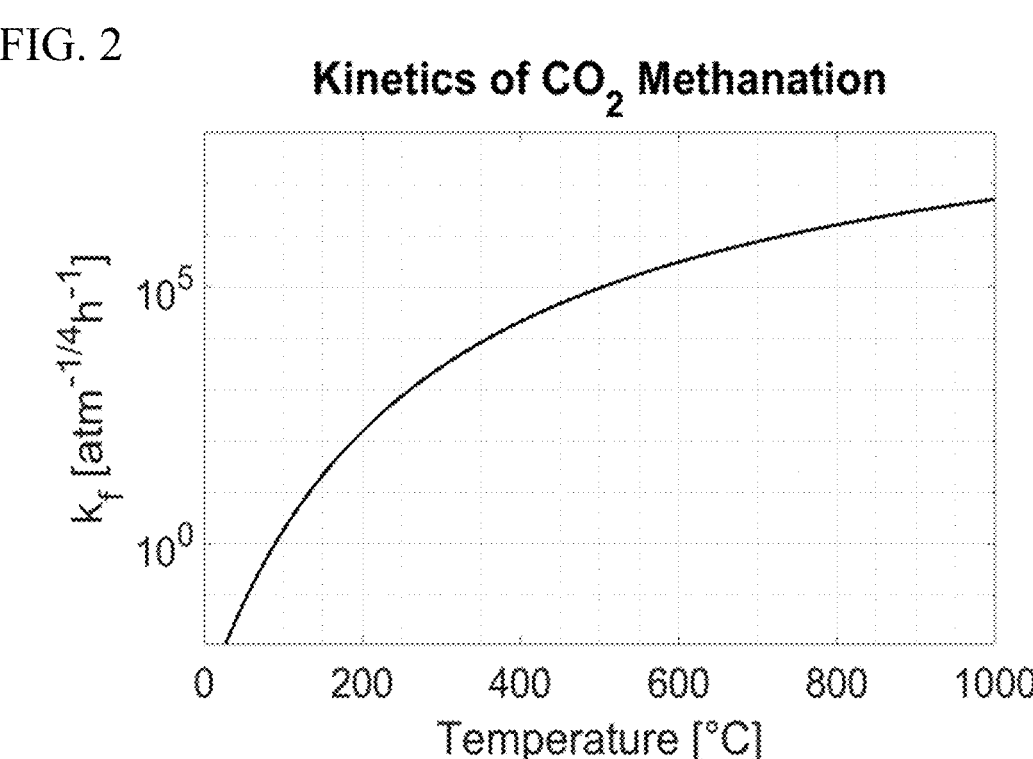
FIG. 2 represents the kinetics of $CO_2$ methanation as a function of the temperature.

The present detailed description is intended to illustrate the invention in a non-limitative manner since any feature of an embodiment may be combined with any other feature of a different embodiment in an advantageous manner.

Disclosed herein is a methanation reactor system including a reactor vessel comprising a housing defining a reaction chamber comprising a gas loading zone and a catalyzed reaction zone; a cooling system; a gas flow system; a heating element in the vicinity of the reaction chamber; a temperature sensing system and a temperature management system, the catalyzed reaction zone of the reaction chamber comprises a catalyst bed, the cooling system comprises a plurality of coolant circulation lines within the catalyst bed, the gas flow system comprises a reaction gas feeding system configured to load reaction gases into the loading zone of the reaction chamber and a reaction gas exhaust system to exhaust reacted gases through the catalyst bed which is thermo-regulated by the heating element and the cooling system under the control of the temperature management system.

The gas flow system allows loading the reaction gases (e.g. $H_2$ and $CO_2$, preferably a mixture thereof) within the gas loading zone of the reaction chamber through a reaction gas feeding system comprising pressure regulating elements and exhausting the reacted gases (e.g. $CH_4$ and water vapor) from the catalyzed reaction zone of the reaction chamber through a reaction gas exhaust system comprising pressure regulating elements. The gas flow system my further comprise a purge gas feeding system and a purge gas exhaust system to flush purge gases (e.g. He, $N_2$) through the reactor chamber for purging the reaction chamber or calibrating the gas flow.

The heating element allows elevating the temperature of reaction chamber to a temperature at which the methanation reaction starts between the reaction gases within the gas loading zone of the reaction chamber.

The cooling system allows decreasing the temperature of the reaction chamber, in particular within the catalyzed zone, while the methanation reaction proceeds, thereby creating a temperature gradient within the catalyzed reaction zone, in particular within the catalyst bed. Typically, the thermal gradient within the catalyst bed is at least 100° C./cm.

The cooling system comprises a cooling inlet for the coolant (e.g. water, oil or other cooling medium) flow, a coolant circulation line, a coolant outlet and a coolant flow controlling means. The coolant circulation line advantageously comprises a plurality of coolant circulation channels (e.g. tubes) embedded in the reaction chamber and passing through the catalyst bed. The cooling system advantageously comprises a coolant exhaust system to allow controlling the cooling line pressure and maintaining its pressure lower than 5 bar, typically lower than 1.5 bar.

The temperature sensing system comprises temperature sensing elements in various positions of the methanation reactor system, comprising the cooling system (inlet and out lets) and the reaction chamber, in particular the catalyst bed to monitor the temperature of the reaction chamber during the methanation reaction.

The temperature management system 5 allows regulating the temperature of the reaction chamber by regulating the temperature of the coolant entering the cooling system 14 though the cooling inlet 23 and its flow rate through the coolant circulation line(s) 25 and/or the flow space velocity of the reaction gases by regulating the flow rate of the reaction gases from the reaction gas feeding system 17 into the gas loading zone of the reaction chamber 12.

According to a particular aspect, the methanation reactor system further comprises a condenser system on or after the reaction gas exhaust system to eliminate water by condensation from the reacted gases.

Figure 3:
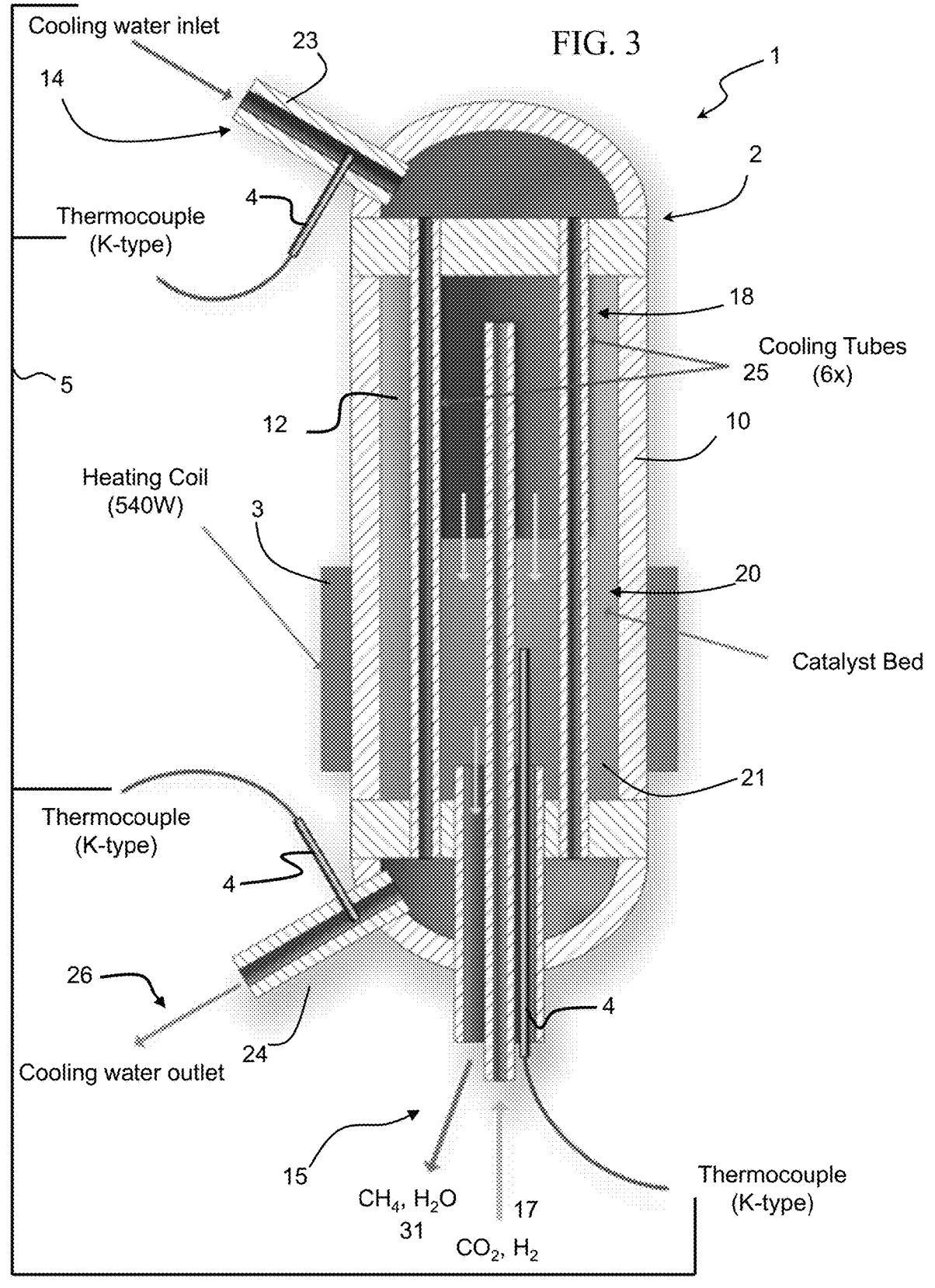
FIG. 3 schematically represents a first embodiment of the methanation reactor.

FIG. 3 shows a first embodiment of the methanation reactor of the present invention which is a chemical reactor for exothermic chemical reaction occurring in the gas phase on a heterogeneous catalyst. The cooling system of the reactor is arranged such that high thermal gradients are present within the reactor, favoring high equilibrium conversion and fast reaction rate simultaneously.

Referring to FIG. 3, a methanation reactor system 1 according to an embodiment of the invention comprises a reactor vessel 2 comprising a housing 10 defining a reactor chamber 12 comprising a gas loading zone 18 and a catalyzed reaction zone 20; a cooling system 14; a gas flow system 15; a heating element 3 in the vicinity of the reactor chamber 12; a temperature sensing system 4 and a temperature management system 5, the catalyzed reaction zone of the reactor chamber comprises a catalyst bed 21, the cooling system comprises a plurality of coolant circulation lines 25 within the catalyst bed, the gas flow system 15 comprises a reaction gas feeding system 17 configured to load reaction gases into the loading zone of the reactor chamber and a reaction gas exhaust system 31 to exhaust reacted gases through the catalyst bed 21 which is thermo-regulated by the heating element 3 and the cooling system 14 under the control of the temperature management system 5.

The gas flow system 15 allows loading the reaction gases (e.g. $H_2$ and $CO_2$, preferably a mixture thereof) within the gas loading zone 18 of the reactor chamber 12 through a reaction gas feeding system 17 and allows exhausting the reacted gases (e.g. $CH_4$ and water vapor) from the catalyzed reaction zone of the reactor chamber through a reaction gas exhaust system 31.

The cooling system comprises a cooling inlet for the coolant 23 (e.g. water, oil or other cooling medium) flow, a coolant circulation line 25, a coolant outlet 24 and a coolant flow controlling means 26. The coolant circulation line 25 advantageously comprises a plurality of coolant circulation channels (e.g. tubes) embedded in the reactor chamber 12 and passing through the catalyst bed 21.

The temperature sensing system comprises temperature sensing elements in various positions of the methanation reactor system, comprising the cooling system (inlet and outlets) and the reactor chamber, in particular the catalyst bed to monitor the temperature of the reactor chamber during the methanation reaction.

Figure 5:
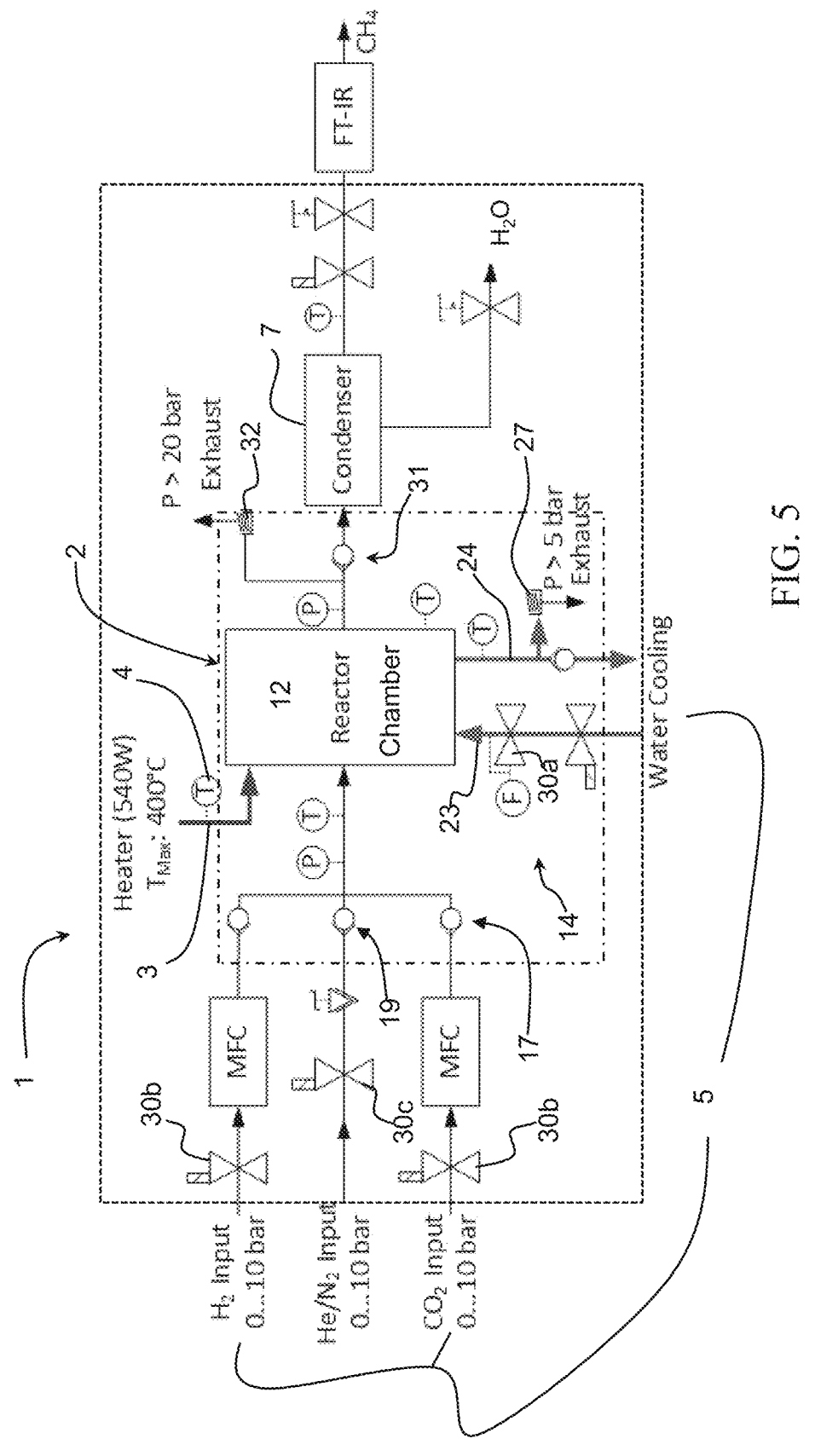
FIG. 5 schematically represents the experimental setup for the methanation reactor.

The temperature management system 5 allows regulating the temperature of the reactor chamber 12 by regulating the temperature of the coolant entering the cooling system 14 though the cooling inlet 23 and its flow rate through the coolant circulation line(s) 25 and/or the flow space velocity of the reaction gases by regulating the flow rate reaction feeding system 17 and thereby the loading of the reaction gases in the gas loading zone 18 of the reactor chamber 12. Referring to FIG. 5, is illustrated in more details a gas flow system 15 which comprises reaction gas feeding system 17 and reaction gas exhaust system 31 with pressure regulating elements (30b and 30c). The gas flow system may further comprise a purge gas feeding system 19 and a purge gas exhaust system 31 to flush purge gases (e.g. He, $N_2$) through the reactor chamber 12 for purging the reactor chamber or calibrating the gas flow.

The pressure regulating elements of the gas flow system (30b to e) allows controlling the reactor chamber pressure and maintaining its pressure lower than 10 bar, typically lower than 6 bar (e.g. 5 bar).

The cooling system 14 advantageously comprises a coolant exhaust system 27 to allow controlling the cooling line pressure and maintaining its pressure lower than 5 bar, typically lower than 1.5 bar.

According to a particular aspect, the methanation reactor system further comprises a condenser system 7 on or after the reaction gas exhaust system 31 to eliminate water from the reacted gases by condensation.

As one can see, the reactor comprises a catalyst bed enclosed in a reactor vessel. The catalysts preferably comprise at least one of Nickel, Cobalt and Ruthenium based catalysts, for example 20% wt. $Ni/Al_2O_3$ or 3% wt. $Ru/Al_2O_3$.

It also comprises one or several cooling tubes placed in the reactor vessel and passing through the catalyst bed and which are fed with a cooling medium such as water, oil or any other fluid suitable for this purpose. Preferably the cooling medium is at ambient Temperature when fed in, but this is clearly not mandatory and it is possible to have an homogeneous coolant temperature in the tubes or a serial arrangement where the temperature would be different in the different tubes.

The cooling tubes are disposed such that the temperature distribution in the reactor shows large thermal gradients of at least 20° C./cm, preferably 100° C./cm, thereby generating hot spots throughout the reactor. The temperature gradients can be controlled by controlling either the space velocity of the inlet reactant gases and/or the flow rate of the cooling medium.

This arrangement provides a combination of hot spots and colder zones within a small volume what allows molecules to reach a high kinetic energy while maintaining the reaction equilibrium on the side of the products. Thus, a conversion higher than that achievable under near-isothermal conditions is reached.

In order to maximize the reaction conversion, the minimal distance between the tubes should not be less than 1.5 times the tube diameter, or even better 2.0 times the tube diameter or more.

We will now describe the thermal management of the methanation reactor of the present invention. The thermal management of the methanation reactor has to address two issues: first, the reactor has to be pre-heated in order to start the reaction. Second, and as already mentioned, the methanation reaction is highly exothermic. Therefore, an adequate thermal management system has to be developed in order to effectively remove the heat from the reaction zone and to control the temperature of the chemical reactor.

As explained below, with this reactor, a conversion greater than 95% and even greater than 99% in a single stage reactor has been experimentally measured.

The chemical reactor of the present invention can be used for any exothermic reaction that is thermally limited. It is also particularly adapted for the production of a mixture of water and methane from carbon dioxide and hydrogen (Sabatier reaction). In any case, the application of this reactor is independent on the upstream (production of hydrogen and carbon dioxide) and downstream (use of the methane and water) processes.

The space velocity refers to the quotient of the entering volumetric flow rate of the reactants divided by the reactor volume which indicates how many reactor volumes of feed can be treated in a unit time. For example, space velocity in a methanation process conducted according to the invention can be from about 0.14 to about 0.55 $s^{-1}$ at a temperature from about 150 to about 400° C. and at a pressure of the reaction chamber from about 1 to about 10 bar.

EXAMPLE

An example of the reactor and of its use will now be described.

In the present case, the target production was set to 100 g $CH_4$/hr. The reactor was fed with a stoichiometric mixture of $H_2$ and $CO_2$, with nominal volumetric flows of 9.33 Nl/min and 2.33 Nl/min, respectively. The total power of the reactor amounted to around 2 kW, split in 1.54 kW contained in the produced methane and 0.44 kW supplied in the form of heat.

As a catalyst, a commercial ruthenium based catalyst was selected for the chemical reactor. The catalyst was supplied by Sigma Aldrich and has a 0.5% wt ruthenium loading on alumina. It is pressed in cylindrical pellets with an average diameter of 3.2 mm and a length of 5 mm. The reactor bed is filled with 250 g of this catalyst to form a catalyst bed. Transmission electron micrograph analysis (TEM, FEI, Tecnai G2 spirit twin) was conducted in order to determine the particle size of ruthenium. Both new and used catalyst was measured, with no significant change in the structure and particle size. The sample was prepared by mixing 0.01 g of sample in 1 mL ethanol for 30 min sonication and dispersing in carbon grid. The typical ruthenium particle size is in the range of 9-17 nm and the average size is 11.5 nm. This is slightly larger than reported by Kwak et al., *ACS Catalysis*, 2013, who performed STEM images of a similar catalyst (0.1% wt Ru on $Al_2O_3$) and found ruthenium particle sizes of up to 5 nm once the catalyst had been used. The average ruthenium particle size of 11.5 nm corresponds to a specific surface area of 22.4 $m^2$/g when considering spherical particles.

As an adequate thermal management system, a heating collar with a power of 540 W and a maximal allowable temperature of 400° C. was installed around the reactor tube in order to preheat the reaction zone at startup. Further, the outer wall of the reactor tube was insulated such that the startup time is minimized.

The cooling of the reactor during operation was ensured by six cooling tubes embedded directly in the catalyst bed. The total heat generated in the chemical reactor was calculated following equation (3) below.

$$QjB\backslash = nHlJ\Delta H. \tag{3}$$

Thereby, the value for the reaction enthalpy had to be calculated at the reaction conditions.

It was assumed that the reaction occurs above 140° C. and that water exits the reactor in the vapor phase. Typically, the water condensates outside of the reactor. Therefore, the value for the reaction enthalpy under operating conditions was calculated to 152 KJ/mol and the total heating power of the reaction amounts to 264 W.

The maximal allowable thermal resistance given the existing thermal gradient between the reactor and the cooling fluid was computed and it came out that dissipating such a high heat load by using air as the cooling medium required a fluid velocity of over 100 m/s in the cooling tubes, which is not realistic. Therefore, water was chosen as the cooling medium. A minimal water flow rate of 1.1 g/s was required to fulfill the thermal requirements.

Figure 6:
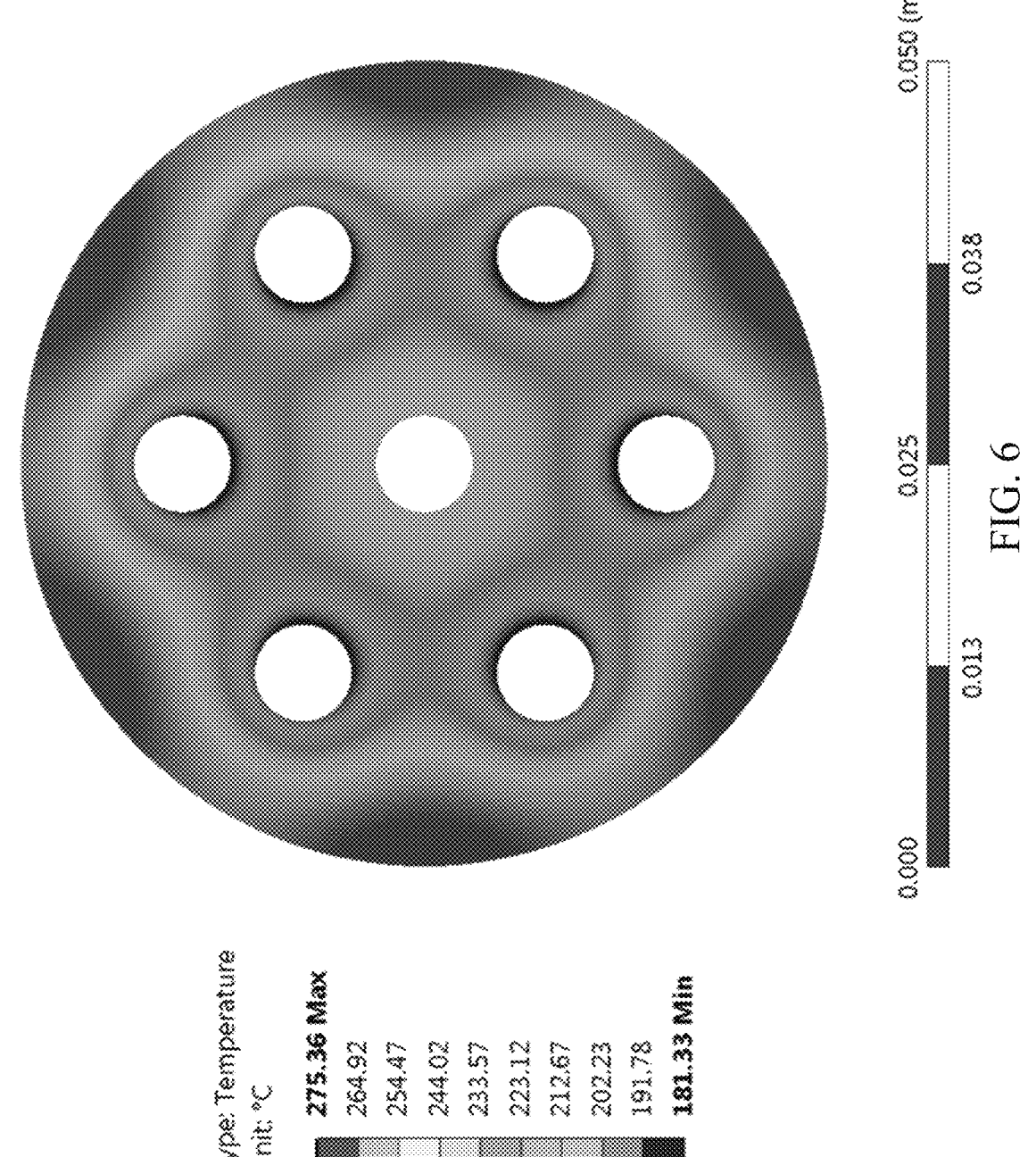
FIG. 6 schematically represents a calculated temperature distribution in the cross-section of the methanation reactor (FEA Simulation).

Regarding the setup, the layout of the experimental setup is represented graphically in FIG. 6. The gas stream of the reactants was controlled by two mass flow meters (Vögtlin Red—Smart). A third gas line was built in for helium or nitrogen, which can be used to flush the system or for calibration purposes. The reactor was designed to operate at temperatures up to 400° C. and pressures up to 10 bar with a structural safety factor of 4. Pressure relief valves were installed on the main gas line and on the cooling loop to protect the system from overpressure. The flow rate of the cooling water was controlled by a proportional valve (Omega FSV 12). The exhaust stream of the reactor was cooled down in order to condensate the water. The composition of the remaining gases was analyzed in a Fourier Transformed Infrared Spectrometer (FT-IR, Alpha Bruker). Several pressure and temperature sensors were embedded in the system to accurately monitor the testing conditions.

Figure 4:
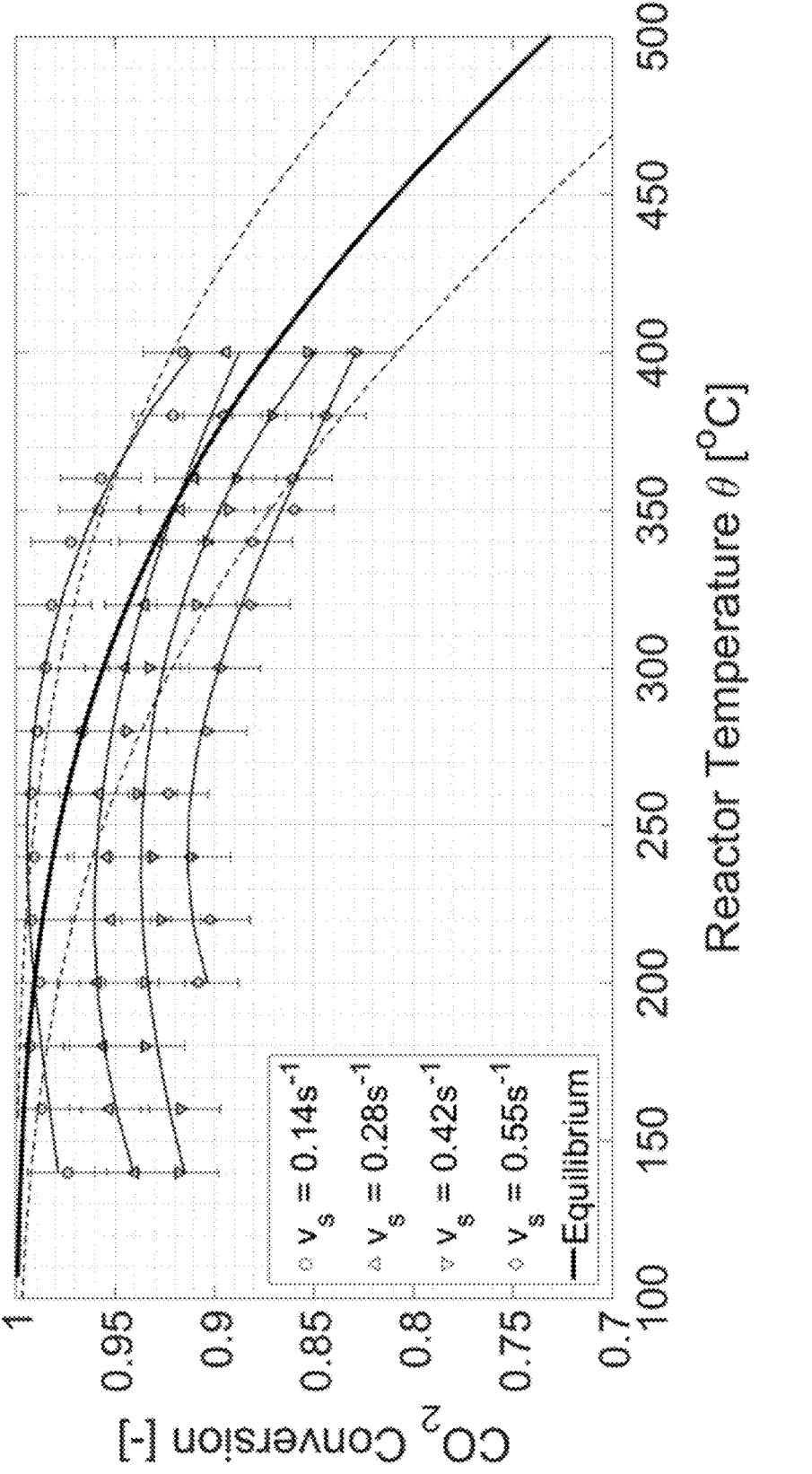
FIG. 4 schematically represents an experimental $CO_2$ conversion at different temperatures and space velocities.

The reactor performance was tested under various conditions of temperature and space velocity. For all experiments, the pressure was set to 5 bar. From FIG. 1, it is seen that an increase in pressure past 5 bar only leads to a marginal increase in the equilibrium conversion. Further, and from the point of view of implementation, $CO_2$ from atmospheric capture is available at low pressure. Thus, in order to avoid the use of an external compressor for the $CO_2$, the reactor pressure is limited to 5 bar. The domain of investigation for the space velocity and the temperature was set to 0.14-0.55 s-1 and 140-400° C. These boundaries were defined to match the SSDS boundary conditions (quantity of methane produced), reactor limits (maximal temperature) as well as thermodynamic modelling and literature review. A total of 57 experiments were carried out in that domain. The calculated conversion are shown in FIG. 4.

The temperature shown as reactor temperature is only a representative value measured at a single point in the catalyst bed, as shown in FIG. 3 (left). In practice, large temperature gradients are present in the reactor because of the local chemical reaction releasing heat and the cooling tubes going directly through the catalyst bed. It was indeed observed that a temperature difference of almost 100° C. exists within the catalyst. In the actual reactor, this behavior is expected to be even exacerbated due to inhomogeneous heat generation due to the spatial variation of the chemical reaction rate within the reactor.

The reactor of the present invention proved to reach a very high conversion of up to 99% at a temperature set point of 260° C., a pressure of 5 bar and a space velocity of 0.14 s-1. A $CO_2$ conversion of 97% was reached at the target flow rate of 50 g/hr H at a temperature set point of 280° C. It was found that the process is limited by the kinetics rather than the thermodynamic equilibrium under the tested conditions. The obtained values are very close to—and in some cases even beyond—the theoretical thermodynamic equilibrium. This is explained by the inhomogeneous temperature distribution in the chemical reactor: while the temperature of the catalyst bed is measured at a single point, there is a temperature distribution within the catalyst bed enabling to balance both kinetics and equilibrium aspects. Finally, no degradation of the catalyst was observed after a period of four months of usage.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example particularly the case regarding the different apparatuses which can be used.

LIST OF ELEMENTS REFERENCED IN THE FIGURES

Methanation reactor system 1
Reactor vessel 2
Housing (air-tight, essentially cylindrical) 10
Reactor chamber 12
Gas mixture loading zone 18
Catalyzed reaction zone 20
    Catalyst bed 21
Cooling system 14
Coolant inlet 23
Coolant outlet 24
Coolant circulation line 25

Coolant flow controlling means 26
Valve 30*a*
Coolant exhaust system 27
Valve 30*b*
Gas flow system 15
Reaction gas feeding system 17
Valve 30*c*
Purge gas feeding system 19
Valve 30*d*
Reaction gas exhaust system 31
Valve 30*c*
Purge gas outlet system 32
Valve 30*f*
Pressure sensing system 33
Heating element (coil) 3
Temperature sensing system 4
Temperature management system 5
Condenser 7

The invention claimed is:

1. A method of production of methane from hydrogen and carbon dioxide comprising the steps of:
  a) providing a chemical reactor comprising a reaction chamber which comprises a gas loading zone and a catalyzed reaction zone comprising a catalyst bed;
  b) loading a reaction gas mixture of hydrogen and carbon dioxide in the gas loading zone of the reaction chamber, such that the gas pressure in the reaction chamber is between 1 and 20 bar;
  c) heating the catalyst bed at a temperature between about 220 and about 260° C. such that the Sabatier reaction and a gas flow through the catalyst bed starts;
  d) creating temperature gradients of at least 20° C./cm within the catalyst bed by cooling the catalyst bed with a cooling system directly integrated in said catalyst bed; and
  e) collecting the resulting gas mixture flowing through the catalyst bed.

2. The method according to claim 1, wherein the chemical reactor comprises a reactor vessel enclosing the catalyst bed and the cooling system comprises cooling tubes placed in the reactor vessel and passing through the catalyst bed, wherein the cooling tubes are disposed within the catalyst bed so as to create the temperature gradients of at least 20° C./cm within the catalyst bed thereby generating hot spots throughout the catalyst bed upon carrying out the Sabatier reaction.

3. The method according to claim 2, wherein the catalyst bed comprises at least one of nickel, cobalt and ruthenium based catalysts.

4. The method according to claim 3, wherein the catalysts comprises 20% wt. Ni/Al$_2$O$_3$ or 3% wt. Ru/Al$_2$O$_3$.

5. The method according to claim 2, wherein the minimal distance between the tubes is not less than 1.5 times the tube diameter.

6. The method according to claim 2, wherein the minimal distance between the tubes is not less than 2 times the tube diameter.

7. The method according to claim 2, wherein the temperature of the cooling medium is different in the different tubes.

8. The method according to claim 2, wherein the tubes are fed with a cooling medium.

9. The method according to claim 2, wherein the temperature gradients are at least 100° C./cm.

10. The method according to claim 2, wherein the temperature gradients are controlled by controlling either the space velocity of the inlet reactant gases and/or the flow rate of the cooling medium.

11. The method according to claim 2, wherein the chemical reactor further comprises a thermal management system adapted to remove the heat from the reaction zone and to control the temperature of the chemical reactor.

12. The method according to claim 1, wherein the chemical reactor further comprises a gas flow system; a heating element in the vicinity of the reaction chamber; a temperature sensing system and a temperature management system, the cooling system comprises a plurality of coolant circulation lines within the catalyst bed, the gas flow system comprises a reaction gas feeding system configured to load reaction gases into the loading zone of the reaction chamber and a reaction gas exhaust system to exhaust reacted gases through the catalyst bed which is thermo-regulated by the heating element and the cooling system under the control of the temperature management system.

13. The method according to claim 12, wherein the cooling system comprises a cooling inlet for the coolant flow, a coolant circulation line, a coolant outlet and a coolant flow controlling means.

14. The method according to claim 12, wherein the cooling system further comprises a coolant exhaust system to allow controlling the cooling line pressure and maintaining its pressure lower than 5 bar or lower than 1.5 bar.

15. The method according to claim 12, wherein the gas flow system allows loading the reaction gases within the gas loading zone of the reaction chamber through a reaction gas feeding system comprising pressure regulating elements and exhausting the reacted gases from the catalyzed reaction zone of the reaction chamber through a reaction gas exhaust system comprising pressure regulating elements.

16. The method according to claim 12, wherein the chemical reactor further comprises a condenser system on or after the reaction gas exhaust system to eliminate water by condensation from the reacted gases.

* * * * *